US007356152B2

(12) United States Patent
Vernon et al.

(10) Patent No.: US 7,356,152 B2
(45) Date of Patent: Apr. 8, 2008

(54) METHOD FOR EXPANDING AN AUDIO MIX TO FILL ALL AVAILABLE OUTPUT CHANNELS

(75) Inventors: Stephen Decker Vernon, Hillsborough, CA (US); Todd Jeffrey Heller Hager, Walnut Creek, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 377 days.

(21) Appl. No.: 10/924,757

(22) Filed: Aug. 23, 2004

(65) Prior Publication Data

US 2006/0039573 A1 Feb. 23, 2006

(51) Int. Cl.
*H04B 1/00* (2006.01)
*H04R 5/00* (2006.01)

(52) U.S. Cl. ............................ 381/119; 381/17; 381/19

(58) Field of Classification Search ................ 381/119, 381/20, 17, 18, 19, 307; 367/4; 369/4
See application file for complete search history.

(56) References Cited

U.S. PATENT DOCUMENTS 4,006,306 A 2/1977 Driscoll
5,594,800 A * 1/1997 Gerzon ........................ 381/20
6,449,371 B1 * 9/2002 Tan et al. .................. 381/119

FOREIGN PATENT DOCUMENTS

EP 1 306 993 A2 5/2003
KR 9705610 4/1997

* cited by examiner

*Primary Examiner*—Vivian Chin
*Assistant Examiner*—George C Monikang
(74) *Attorney, Agent, or Firm*—David N. Lathrop, Esq.; Gallagher & Lathrop

(57) ABSTRACT

Audio sources in typical computer systems provide different numbers of channels of audio signals to a mixing component of the operating system. This conventional arrangement usually prevents the audio signals from all sources from being played back through all output channels. Novel arrangements of upmixing and mixing components are disclosed that allow audio signals to be delivered to all output channels regardless of the configuration of the audio sources and the number of channels that are provided by those audio sources.

10 Claims, 4 Drawing Sheets

METHOD FOR EXPANDING AN AUDIO MIX TO FILL ALL AVAILABLE OUTPUT CHANNELS

TECHNICAL FIELD

The present invention pertains generally to processing audio signals and pertains more specifically to methods and apparatuses that mix multi-channel audio signals from multiple sources.

BACKGROUND ART

The growing popularity of applications such as digital television, DVD-video and DVD-audio is causing multi-channel audio sources to become more common in consumer audio playback systems. This growth in popularity is reflected in the growing number of consumer playback systems that are capable of reproducing three or more channels of audio information. Consumer systems with five full-bandwidth channels and a low-frequency effects (LFE) channel such as those used in home-theatre applications are becoming increasingly common. This particular arrangement is sometimes referred to as 5.1 channels. In spite of this trend, one- and two-channel audio sources such as compact disc (CD) players, MP3 players, conventional analog and digital radio receivers and conventional television receivers are still commonly used and are likely to be widely used for many more years.

As consumers become familiar with the aural realism and impact that is possible from systems with three or more channels, they begin to expect and demand similar performance from system components that provide only one and two channels of audio information. The reproduction of a two-channel audio program through only two channels of a system with more than two channels is becoming unacceptable to a broader range of consumers.

Techniques are known that can expand one- and two-channel signals into a larger number of channels. Products that incorporate Dolby Pro Logic ® II and Dolby Pro Logic IIx technologies of Dolby Laboratories, Inc., San Francisco, Calif., use "upmixing" to expand a two-channel signal into three or more channels of audio information. These products allow a consumer to play back two-channel audio material through a system having three or more channels with an aural experience that is similar to that provided by the playback of audio material that originated from a source having three or more channels. The proper operations of these known techniques relies on two conditions.

The first condition for proper operations is that the number of channels for the audio source must be known. Devices that incorporate Dolby Pro Logic II technology, for example, are designed to operate properly only with two-channel input. Devices that incorporate Dolby Pro Logic IIx technology can operate properly with two and 5.1 input channels but the number of input channels must be known because their operation varies according to the number of input channels. For many applications, this condition can be met easily either because the number of channels is known implicitly or because it is conveyed explicitly with the audio information. For example, it is known implicitly that two channels of audio information are provided by audio sources such as cassette tape decks, CD players and FM-stereo broadcast receivers. Other sources provide signals, such as television signals with encoded audio information conforming with the Advanced Television Systems Committee (ATSC) A/52 specification, that convey "metadata" explicitly specifying the number of channels.

The second condition for proper operation is that all channels in the source must be active; i.e., no channel of the audio source can be silent at all times. For example, if an audio source delivers 5.1 channels of audio information to a receiver with a Dolby Pro Logic IIx decoder and all of the channels except for the left and right channels are muted, the receiver will incorrectly configure the decoder processor and fail to deliver active signals to all of its output channels. Although this situation may not arise often in broadcast situations, it is typical of conditions that exist in computer systems with audio and multi-media capabilities.

The use of computers as sources of audio information in consumer entertainment systems is becoming more common. Special purpose hardware and software allow an otherwise conventional personal computer to operate as a CD player or DVD player for audio and video, a video-game console, a digital television receiver and a music synthesizer to name only a few examples. Many of these sources provide five or more channels of audio information while others provide only two channels.

Within the computer itself, software applications typically deliver their audio output to a common mixer that is capable of combining audio information from several sources and presenting the combined result to an output device such as a so called "sound card" or other output device. Output signals from this device can be provided to an acoustic output transducer such as headphones or to an amplifier that drives one or more loudspeakers, or they can be provided to other hardware or software devices for subsequent processing.

In environments such as that found in computers running one of the Windows operating systems available from Microsoft Corporation, Redmond, Wash., the mixing function is provided by a component of the operating system or by a special-purpose driver that is installed to support a particular sound card or other output device. The number of output channels supported by this mixing function typically depends on the number of channels that are supported by the output device. If the output device is limited to two channels, the mixing function provides two output channels. If the output device supports 5.1 channels, the mixing function provides 5.1 output channels. In typical installations, the number of output channels and the mixing process of the mixing function cannot be adjusted. This situation presents limitations that cannot be overcome by known techniques.

For example, suppose a computer system has a sound card that supports 5.1 output channels and two audio sources. In principle, either one or both of these sources may be implemented by hardware and software within the computer system or by devices that are external to the computer. In this example, the first source is a CD-player that provides two channels of audio information that are configured as left and right channels and the second source is a video game that provides 5.1 channels of audio information configured as left, right, center, left-surround, right-surround and low-frequency effects (L, R, C, LS, RS, LFE) channels. A typical mixing function in the computer mixes the respective input channels together. The left-channel signals from all sources are mixed and provided at a left-channel output of the mixer. The right-channel signals from all sources are mixed and provided at a right-channel output of the mixer. Similarly the C, LS, RS and LFE channel signals from all sources are mixed and provided at respective outputs. In this example, however, only left channel and right channel signals from both sources are mixed because only one of the sources provides C, LS, RS and LFE channel signals. A consumer would hear audio from the CD player through only two channels of the system but would hear audio from the video game through all channels. As mentioned above, consumers are coming to expect and demand that the audio from all sources be presented through all channels.

What is needed is a facility that overcomes this limitation of the prior art.

DISCLOSURE OF INVENTION

It is an object of the present invention to provide for methods and apparatuses that provide for expanding an audio mix to fill all available output channels. This object is achieved by the invention as set forth in the independent claims. Further advantages are realized by additional features as set forth in the dependent claims.

According to one aspect of the present invention, an apparatus that mixes audio signals from a plurality of audio sources includes a first mixer with input channels coupled to output channels of the audio sources, an upmixer with one or more input channels coupled to a first group of output channels of the first mixer, and a second mixer with a first group of input channels coupled to output channels of the upmixer and a second group of input channels coupled to a second group of output channels of the first mixer.

According to another aspect of the present invention, a method of processing audio signals includes mixing signals from output channels of a plurality of audio sources to generate a plurality of first mixed signals arranged in a first group of one or more first mixed signals and a second group of one or more first mixed signals, upmixing the first mixed signals in the first group of first mixed signals to generate a plurality of first upmixed signals, and mixing one or more channels of the first upmixed signals and one or more processed signals obtained from the one or more first mixed signals to generate a plurality of output signals.

Various features of the present invention may be better understood by referring to the following discussion and the accompanying drawings in which like reference numerals refer to like elements in the several figures. The following discussion and the associated drawings describe a few ways in which the present invention may be implemented by software components of a personal computer system. These implementations are set forth as examples only and should not be understood to represent limitations upon the scope of the present invention. The present invention may be implemented in a wide variety of ways including various combinations of hardware and software within a computer system and the use of devices other than computers.

MODES FOR CARRYING OUT THE INVENTION

A. Introduction

Signals generated by audio sources within a typical personal computer systems provide signals to an audio mixing component that combines its input signals to generate a set of signals for delivery to a so called "sound card" or other output device. Output signals from the output device can be provided to an acoustic output transducer such as headphones or to an amplifier that drives one or more loudspeakers, or they can be provided to other hardware or software devices for subsequent signal processing or storage.

Figure 1:
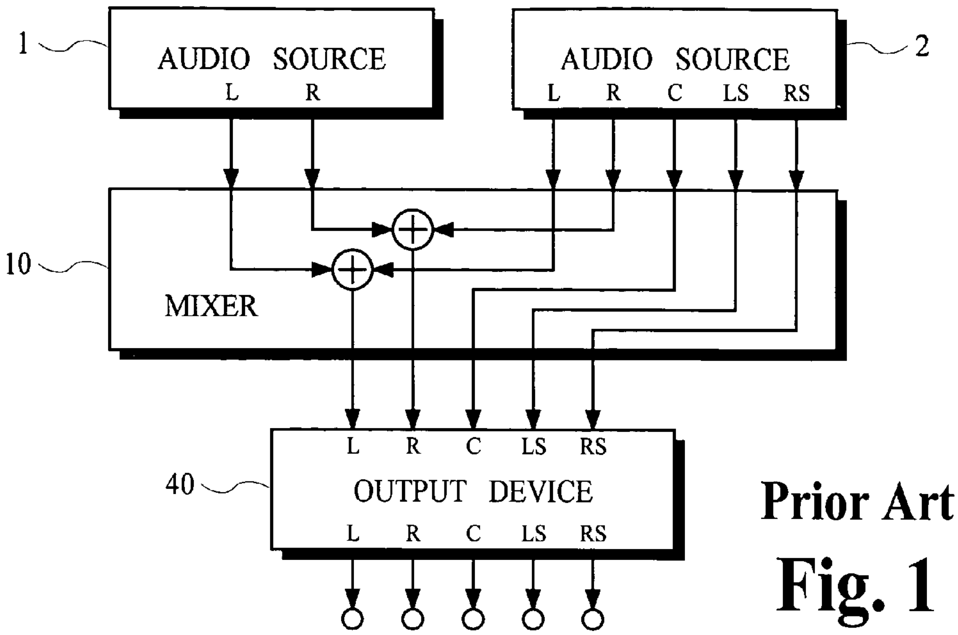
Prior Art Fig. 1
FIG. 1 is a schematic illustration of a conventional mixer that mixes audio signals from a two-channel source with audio signals from a five-channel source.

FIG. 1 is a schematic illustration of an audio mixing component 10 such as those found in conventional personal computer systems that mixes audio signals from multiple audio sources 1, 2. Typically, the number of output channels provided by the mixing component 10 depends on the capabilities of an output device 40 such as a sound card or equivalent chipset of a motherboard. If the output device 40 is limited to two channels, the mixing component 10 typically generates a two-channel output. If the output device 40 is capable of supporting a 5.1 channel configuration, the mixing component 10 generates a 5.1 channel output.

This traditional arrangement causes problems that conventional technologies cannot overcome. Referring to FIG. 1, audio source 1 represents a two-channel audio source such as a conventional stereo CD player and audio source 2 represents a 5.1 channel audio source such as a DVD player for playback of a motion picture and the accompanying soundtrack.

When the audio source 1 is active, signals for two channels are provided as input to the mixer 10. When the audio source 2 is active, signals for 5.1 channels are provided as input to the mixer 10. In typical computer architectures, the two channel signals from the audio source 1 are mixed into a 5.1 channel output in a very simple way; the left and right channel signals are delivered directly to the left and right output channels, respectively, and the other output channels are not affected. The 5.1 channel signals from the audio source 2 are mixed directly into a 5.1 channel output by delivering each input channel to its respective output channel. This architecture is shown in FIG. 1. The LFE channel, which is the ".1" channel part of the 5.1 channel configuration, is omitted from this and all other figures for illustrative clarity.

A listener can hear audio from the audio source 2 through all 5.1 channels but can hear audio from the audio source 1 only through the left and right channels. As mentioned above, this arrangement is no longer acceptable to consumers who expect audio from all sources to be presented through all available output channels.

Figure 2:
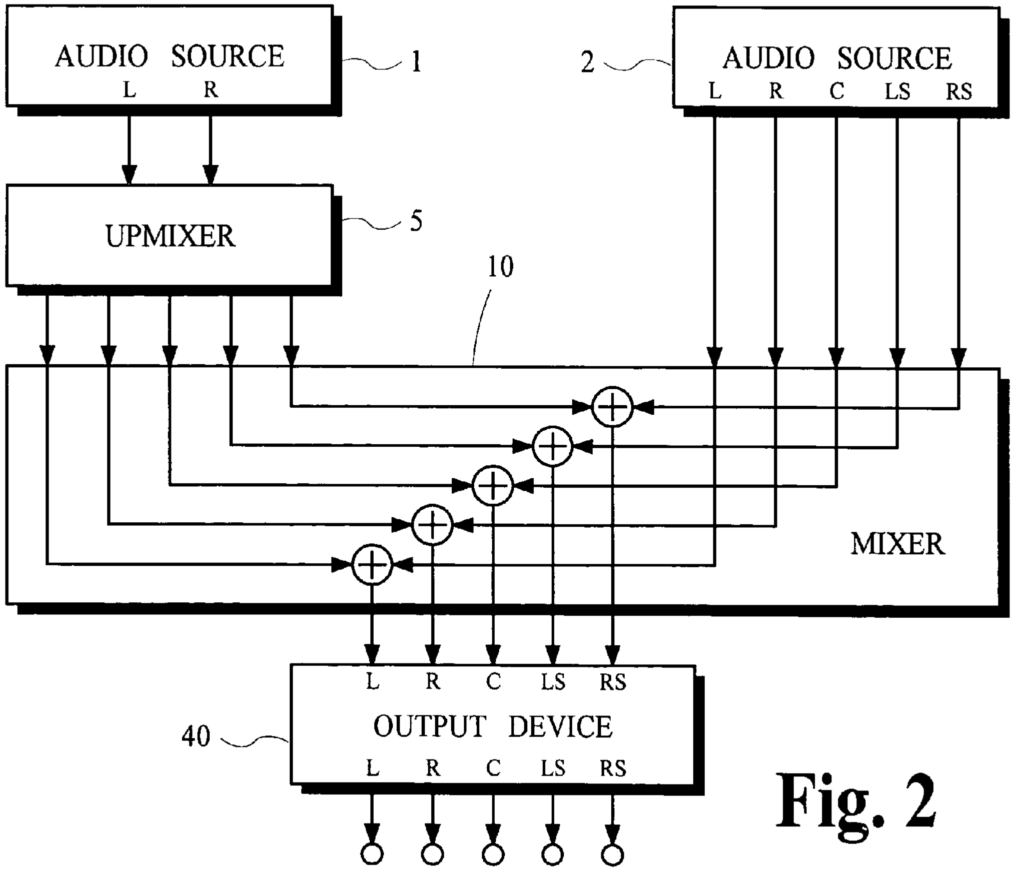
FIG. 2 is a schematic illustration of one way in which audio signals from a two-channel source may be expanded and mixed with audio signals from a five-channel source to provide signals for five output channels.

One way in which this problem can be solved is illustrated in FIG. 2. According to this solution, audio signals from the two-channel audio source 1 are processed by an upmixer 5 that synthesizes a 5.1 channel set of signals in response to two channel signals and delivers the synthesized signals to the mixer 10. In principle, the upmixer 5 can be implemented by components within the audio source 1, within the mixer 10, or within a component that is inserted between the audio source 1 and the mixer 10. Unfortunately, none of these arrangements are practical in conventional personal computer systems for at least two reasons. First, many implementations of two-channel audio sources exist that cannot be modified to incorporate the upmixing component. Second, software architectures for conventional computer systems implement the mixer 10 as part of the operating system, which does not allow upmixing components to be incorporated into the mixing component or to be inserted between the audio sources and the mixing component.

Figure 3:
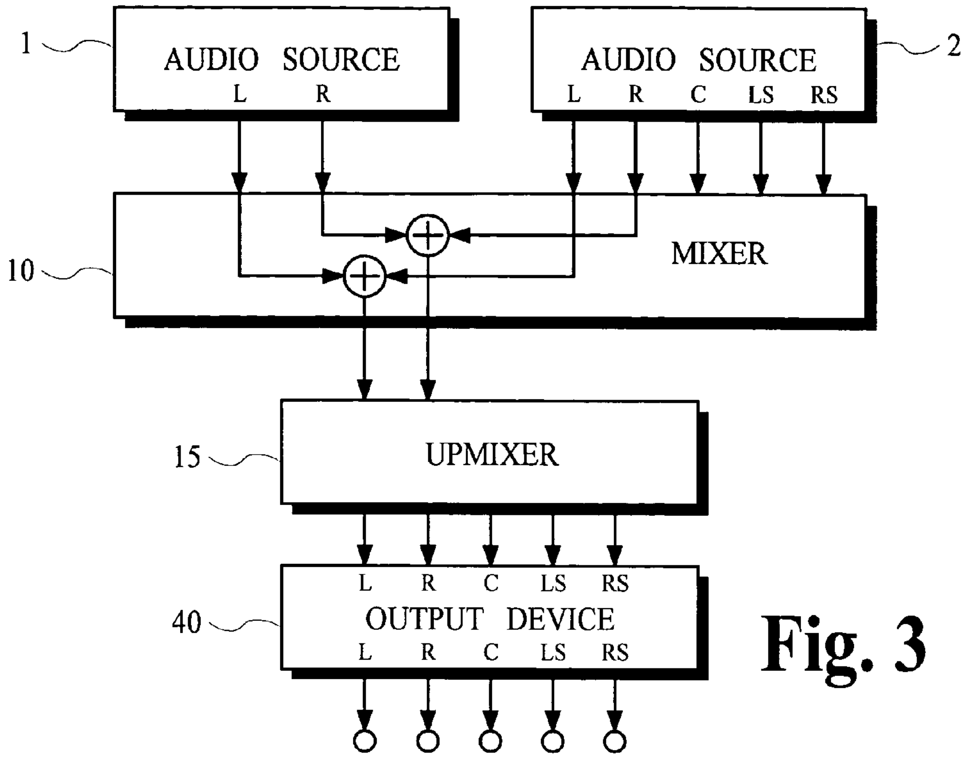
FIG. 3 is a schematic illustration of one way in which audio signals from a two-channel source may be mixed with audio signals from a five-channel source and subsequently expanded to provide signals for five output channels.

Another way in which the limitations of conventional computer systems can be overcome is illustrated in FIG. 3. According to this solution, the upmixer 15 is coupled to the output of the mixer 10. This may be done by implementing the upmixer 15 in a software driver that is associated with the output device 40. Unfortunately, this approach does not work well. Upmixing the left and right channels to synthesize a 5.1 channel set of signals provides the desired result when the only input is from two-channel audio sources but it either ignores or distorts the content that is present in the remaining channels that are provided by 5.1 channel audio sources.

Figure 4:
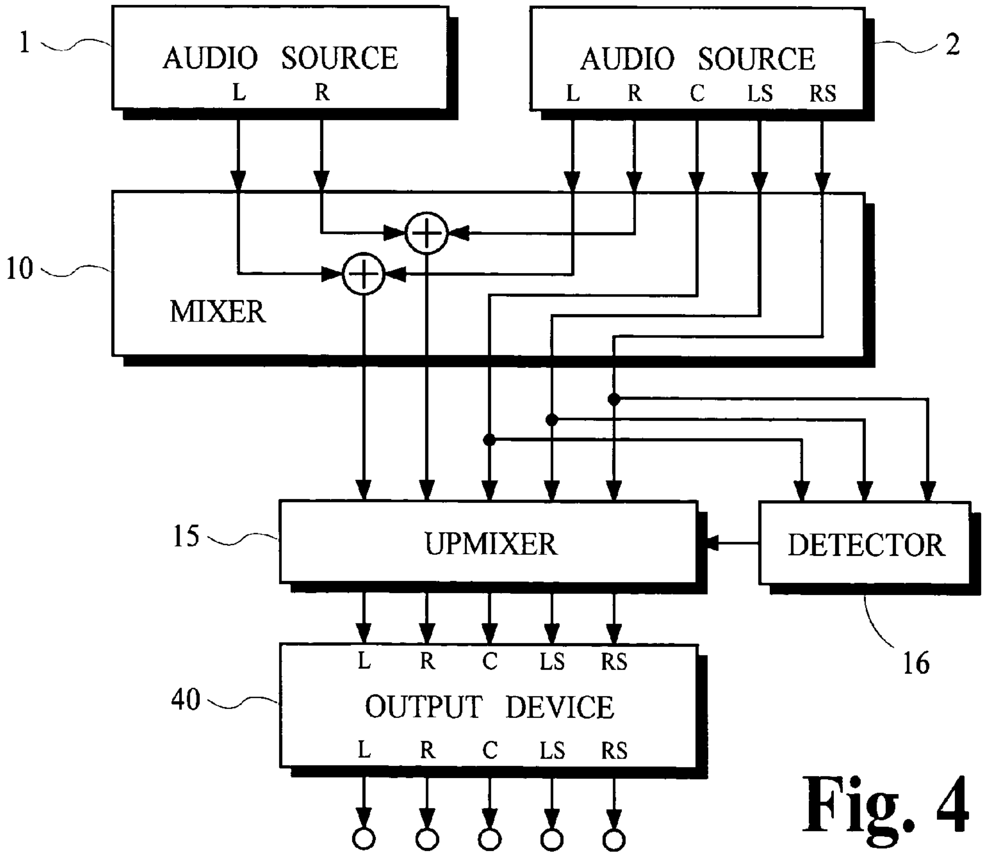
FIG. 4 is a schematic illustration of one way in which audio signals from a two-channel source may be mixed with audio signals from a five-channel source and adaptively expanded as necessary to provide signals for five output channels.

One potential solution to this problem is illustrated in FIG. 4. According to this solution, the upmixer 15 is applied adaptively. For example, the system could disengage the upmixer 15 if the detector 16 detects any significant signal energy in the center, left surround or right surround mixer output channels. Unfortunately, this approach has at least three disadvantages. Because the adaptation depends on the detection of signal energy in some of the channels, a delay in adaptation is unavoidable and it is often difficult to engage or disengage the upmixer 15 without introducing audible artifacts into the output signals. In addition, the detector 16 may incorrectly engage the upmixer 15 for signals from the audio source 2 during intervals when no significant signal energy is present in the center, left surround or right surround mixer output channels. Furthermore, this approach is unable to handle correctly those situations in which signals from the audio source 1 and the audio source 2 are generated simultaneously and mixed together by the mixer 10.

The present invention overcomes limitations of the prior art and allows signals to be delivered to all output channels regardless of the configuration of the audio sources and the number of channels that are provided by those audio sources.

Figure 5:
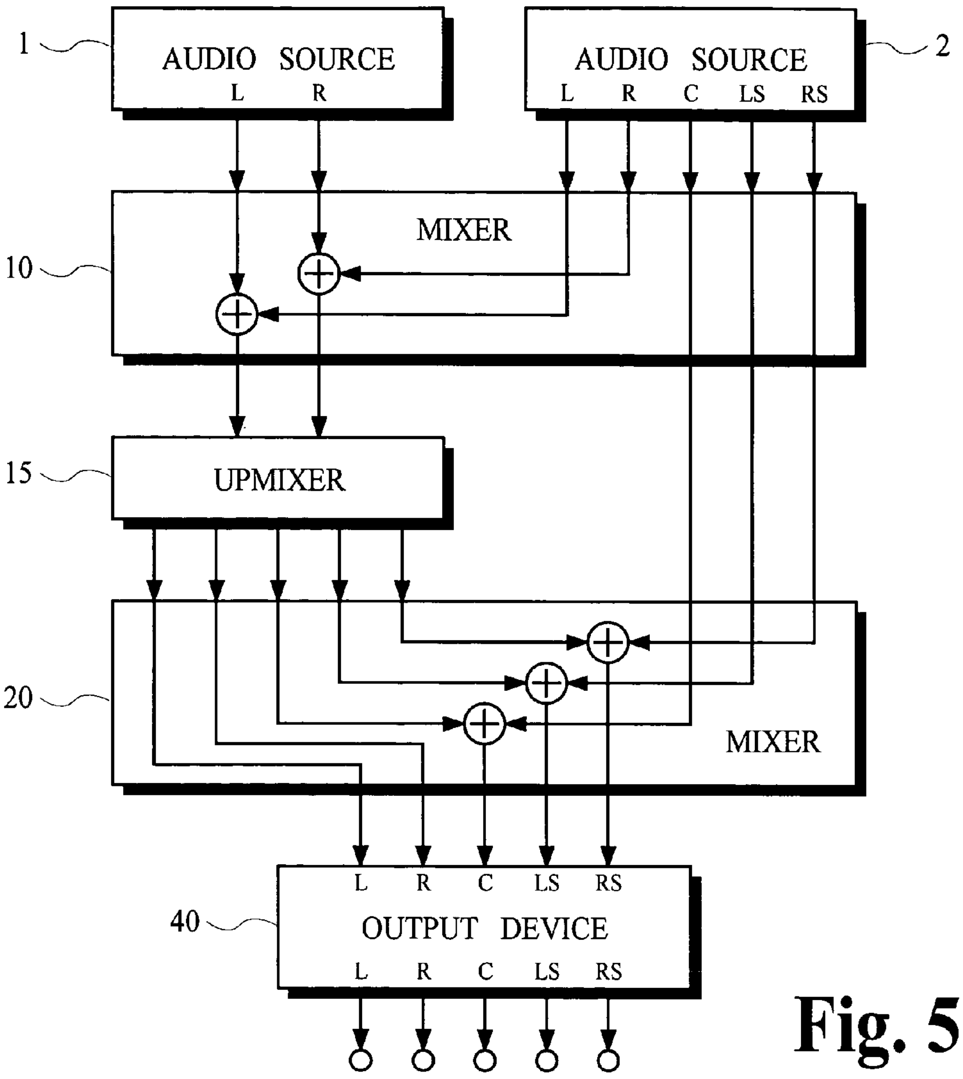
FIG. 5 is a schematic illustration of one way according to the present invention to mix audio signals from a two-channel source with audio signals from a five-channel source to provide signals for five output channels.

FIG. 5 is a schematic illustration of one way according to the present invention in which audio signals from a two-channel source may be mixed with audio signals from a 5.1 channel source to provide signals for 5.1 output channels. According to this solution, left and right channel signals from the audio source 1 are mixed with the left and right channels signals from the audio source 2. The two channels that result from this mix are provided to the upmixer 15, which synthesizes a 5.1 channel set of signals from its two-channel input. The upmixing technology incorporated into Dolby Pro Logic II products may be used; however, the upmixer 15 may be implemented by essentially any set of upmixing equations that may be desired. The remaining output channels of the mixer 10 are provided to inputs of a mixer 20. Output channels of the upmixer 15 are also provided to inputs of the mixer 20. The mixer 20 mixes the signals that are received from the mixer 10 and the upmixer 15 to provide 5.1 output channels. This approach provides a set of output signals from the mixer 20 that contain both a 5.1 channel expansion of the two-channel signals from the audio source 1 as well as a 5.1 channel version of the 5.1 channel signals from the audio source 2.

Figure 6:
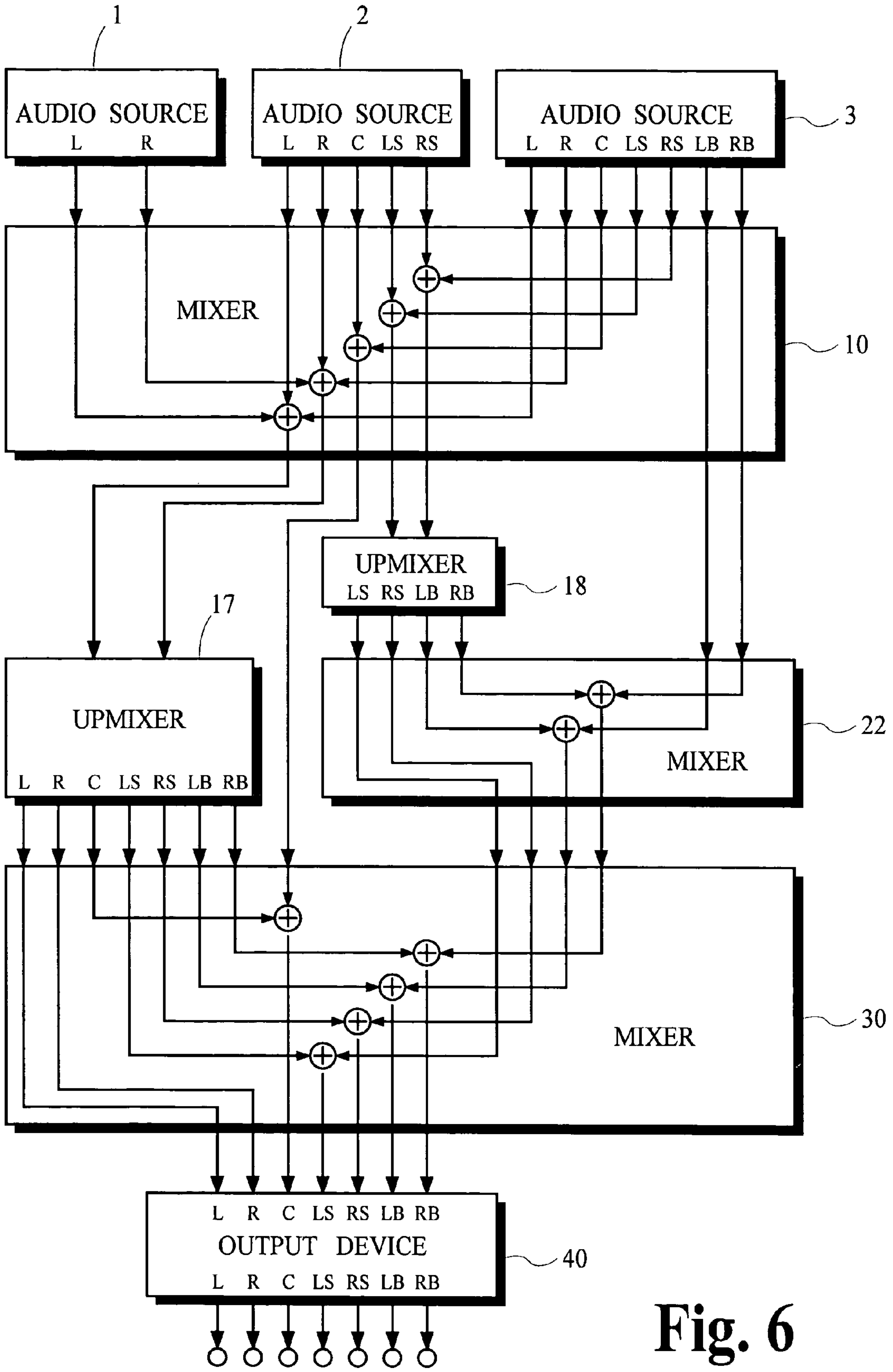
FIG. 6 is a schematic illustration of one way according to the present invention to mix audio signals from a two-channel source, a five-channel source and a seven-channel source to provide signals for seven output channels.

Principles of the present invention may be applied repeatedly as needed to provide for larger numbers of different channel configurations. FIG. 6 is a schematic illustration of one way according to the present invention in which audio signals from two, 5.1 and 7.1 channel sources may be mixed to provide for 7.1 output channels in a left, right, center, left-surround, right-surround, left-back, right-back and low-frequency effects (L, R, C, LS, RS, LB, RB, LFE) channel configuration. According to this solution, respective left and right channel signals from the audio source 1, the audio source 2 and the audio source 3 are mixed together and provided to the upmixer 17, which synthesizes a 7.1 channel set of signals from its two-channel input. The upmixing technology incorporated into Dolby Pro Logic IIx products may be used; however, the upmixer 17 may be implemented by essentially any set of upmixing equations that may be desired. The surround-sound channel signals of the audio source 2 are mixed with the corresponding channel signals of the audio source 3 and provided to the surround-channel upmixer 18, which synthesizes a four-channel set of set of surround-sound signals that are provided to the mixer 22. The upmixing technology incorporated into Dolby Pro Logic IIx products may be used; however, the upmixer 18 may be implemented by essentially any set of upmixing equations that may be desired. The remaining surround-channel signals from the audio source 3 are provided to the mixer 22, which mixes signals for the respective back-surround channels. Its output, along with the output of the upmixer 17, are provided as input to the mixer 30. The mixer 30 mixes its input signals to provide 7.1 output channels. This approach provides a set of output signals from the mixer 30 that contain both a 7.1 channel expansion of the signals from the audio source 1 and the audio source 2 as well as a 7.1 channel version of the 7.1 channel signals from the audio source 3.

Other implementations are possible. For example, in one alternate implementation the left and right channel output signals of the mixer 10 are upmixed to 5.1 channels and combined in an additional mixer with the center, left surround and right surround channel signals of the mixer 10 output. The upmixing technology found in Dolby Pro Logic II products, for example, may be used to synthesize 5.1 channels from two channels. The 5.1 channel output signals of this additional mixer are upmixed to 7.1 channels in a surround channel upmixer and provided as input to the mixer 30. The upmixing technology found in Dolby Pro Logic IIx products, for example, may be used to synthesize 7.1 channels from 5.1 channels. The implementation shown in FIG. 6 may be preferred over this alternative implementation, however, because this alternative implementation requires some signals to pass through more than stage of upmixing.

B. Implementation

Figure 7:
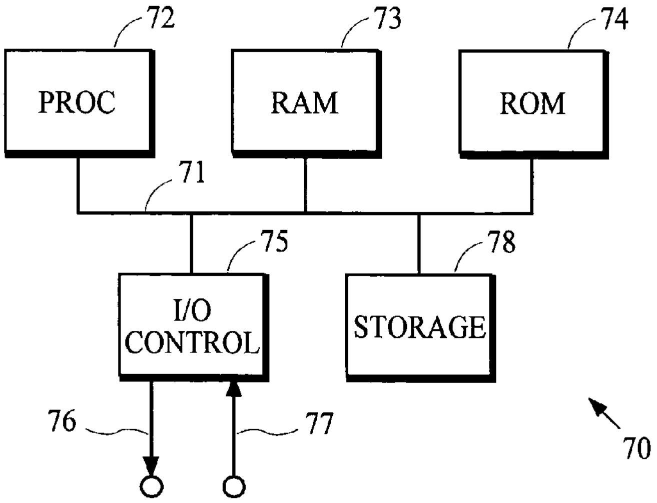
FIG. 7 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 7 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, solid-state memory, and detectable markings on media including paper.

The invention claimed is:

1. An apparatus for mixing audio signals from a plurality of audio sources, wherein one or more of the audio sources have a first number of output channels and one or more of the audio sources have a second number of output channels, wherein the second number is greater than the first number, and wherein the apparatus comprises:

a first mixer including a plurality of output channels and including a plurality of inputs, each of the inputs having input channels coupled to the output channels of a respective audio source in the plurality of audio sources, wherein the output channels of the first mixer are arranged in a first group of one or more output channels and a second group of one or more output channels;

a first upmixer including a plurality of output channels and including one or more input channels coupled to the one or more output channels in the first group of output channels of the first mixer; and a second mixer including a plurality of output channels and including a plurality of input channels arranged in a first group of two or more input channels and a second group of one or more input channels, wherein the first group of input channels of the second mixer are coupled to the output channels of the first upmixer and the one or more input channels in the second group of input channels of the second mixer are coupled to the one or more output channels in the second group of output channels of the first mixer.

2. The apparatus according to claim 1 wherein:

the first number is a positive integer denoted N and the second number is a positive integer denoted M;

the first mixer includes M output channels, the first group of output channels has N output channels and the second group of output channels has M−N output channels;

the first upmixer includes N input channels and M output channels; and the second mixer includes M output channels, and includes input channels arranged in the first group having M input channels and the second group having M−N input channels.

3. The apparatus according to claim 1 that comprises a second upmixer and a third mixer interposed between the first mixer and the second mixer, wherein:

the first mixer has two or more output channels in the second group of output channels;

the second upmixer includes a plurality of output channels and includes one or more input channels coupled to at least some of the output channels in the second group of output channels of the first mixer; and the third mixer includes a plurality of input channels coupled to the output channels of the second upmixer and to at least some of the output channels in the second group of output channels of the first mixer, and includes one or more output channels coupled to at least some of the one or more input channels in the second group of input channels of the second mixer.

4. The apparatus according to claim 3 wherein:

the first number is a positive integer denoted N and the second number is a positive integer denoted M;

the first mixer includes M output channels, the first group of output channels has N output channels and the second group of output channels has M−N output channels;

the first upmixer includes N input channels and M output channels;

the second mixer includes M output channels, and includes input channels arranged in the first group having M input channels and the second group having M−N input channels;

the second upmixer has X input channels and has Y output channels, where X and Y are positive integers, X is less than Y and Y is less than M−N;

the output channels in the second group of output channels of the first mixer are arranged in subgroups, a first subgroup having X output channels and a second subgroup having (M−N)−X output channels, wherein the input channels of the second upmixer are coupled to the output channels in the first subgroup of output channels of the first mixer; and the third mixer has at least Y output channels.

5. A method for mixing audio signals from a plurality of audio sources, wherein one or more of the audio sources have a first number of output channels and one or more of the audio sources have a second number of output channels, wherein the second number is greater than the first number, and wherein the method comprises:

receiving source signals from each output channel of one or more of the audio sources and mixing one or more respective channels of the source signals to generate a plurality of first mixed signals arranged in a first group of one or more first mixed signals and a second group of one or more first mixed signals;

upmixing the first mixed signals in the first group of first mixed signals to generate a plurality of first upmixed signals; and mixing one or more respective channels of the first upmixed signals and one or more processed signals obtained from the one or more first mixed signals to generate a plurality of output signals.

6. The method according to claim 5 wherein the processed signals are equal to the first mixed signals.

7. The method according to claim 5 that comprises:

upmixing the one or more first mixed signals in the second group of first mixed signals to generate a plurality of second upmixed signals; and mixing one or more respective channels of the second upmixed signals and at least some of the one or more first mixed signals in the second group of first mixed signals to obtain the processed signals.

8. A computer readable medium encoded with a computer program to perform a method for mixing audio signals from a plurality of audio sources, wherein one or more of the audio sources have a first number of output channels and one or more of the audio sources have a second number of output channels, wherein the second number is greater than the first number, wherein the method comprises:

receiving source signals from each output channel of one or more of the audio sources and mixing one or more respective channels of the source signals to generate a plurality of first mixed signals arranged in a first group of one or more first mixed signals and a second group of one or more first mixed signals;

upmixing the first mixed signals in the first group of first mixed signals to generate a plurality of first upmixed signals; and mixing one or more respective channels of the first upmixed signals and one or more processed signals obtained from the one or more first mixed signals to generate a plurality of output signals.

9. The computer readable medium according to claim 8 wherein the processed signals are equal to the first mixed signals.

10. The computer readable medium according to claim 8 wherein the method comprises:

upmixing the one or more first mixed signals in the second group of first mixed signals to generate a plurality of second upmixed signals; and mixing one or more respective channels of the second upmixed signals and at least some of the one or more first mixed signals in the second group of first mixed signals to obtain the processed signals.

* * * * *